United States Patent Office 3,433,793
Patented Mar. 18, 1969

3,433,793
XANTHENYLISONIPECOTONITRILES AND
RELATED COMPOUNDS
Peter Yonan, Chicago, Ill., assignor to G. D. Searle & Co.,
Chicago, Ill., a corporation of Delaware
No Drawing. Filed May 18, 1966, Ser. No. 550,902
U.S. Cl. 260—293.4                                4 Claims
Int. Cl. C07d 29/34; A61k 27/00

ABSTRACT OF THE DISCLOSURE

Isonipecotonitriles having a xanthenyl or thioxanthenyl substituent at the 1-position are described herein. The compounds are prepared by the reaction of the appropriate isonipecotonitrile with xanthydrol or thioxanthydrol. The compounds involved are useful as anti-ulcer agents, pepsin inhibitors, anti-bradykinin agents, and anti-hypertensive agents.

---

The present invention relates to xanthenylisonipecotonitriles and related compounds. In particular, the present invention relates to a group of compounds having the following general formula:

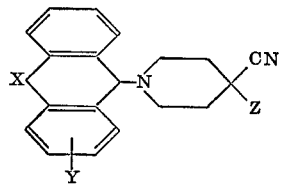

wherein X is selected from the group consisting of O and S; Y is selected from the group consisting of hydrogen, halogen, and methyl; Z is selected from the group consisting of hydrogen, phenyl, and substituted phenyl. The halogens referred to above include fluorine, chlorine, bromine, and iodine. The substituted phenyl radicals referred to above include groups such as tolyl and halophenyl. The halophenyl groups include fluorophenyl, chlorophenyl, bromophenyl, and iodophenyl.

The compounds of this invention are conveniently prepared by the reaction of a xanthydrol or thioxanthydrol with isonipecotonitrile or an appropriately substituted isonipecotonitrile. The reaction is conveniently carried out at reflux in an inert solvent in the presence of a weak acid. Toluene is a particularly useful solvent although benzene and xylene are examples of other solvents which can be used for this purpose. A weak acid such as acetic acid can be used to catalyze the reaction. In addition, it is useful to carry out the reaction in an apparatus equipped with a water trap so that water can be removed from the reaction mixture as it is formed.

The compounds of the present invention are useful because of their pharmacological properties. In particular, the present compounds possess activity as anti-ulcer agents. This activity is demonstrated by their inhibition of ulceration in the Shay rat. In addition, the present compounds possess activity as pepsin inhibitors, anti-bradykinin agents, and anti-hypertensive agents.

The following examples are presented to further illustrate the present invention; they should not be construed as limiting it in spirit or in scope. In these examples, quantities are indicated in parts by weight and temperatures in degrees centigrade (° C.).

EXAMPLE 1

A solution is prepared from 40 parts of xanthydrol, 525 parts of toluene and 12 parts of glacial acetic acid. The solution is heated almost to reflux and 22 parts of isonipecotonitrile is added. The resultant mixture is then refluxed for 4.5 hours in an apparatus equipped with a water trap. The hot solution is then treated with charcoal and filtered and the solvent is evaporated from the filtrate under reduced pressure to leave a residual oil. Ether is added to this residue and the resultant mixture is filtered to remove some gelatinous material. The solvent is then evaporated from the ether solution to leave a residual oil which solidifies when triturated with hexane. The product obtained in this way is 1-(9-xanthenyl)isonipecotonitrile melting at about 83–85° C. This compound has the following formula:

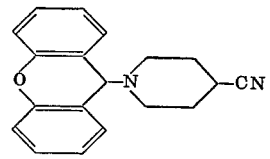

EXAMPLE 2

An equivalent quantity of 2-chloroxanthydrol is substituted for the xanthydrol and the procedure of Example 1 is repeated. The product obtained is 1-(2-chloro-9-xanthenyl)isonipecotonitrile melting at about 108–109° C. after recrystallization from a mixture of acetone and pentane.

Likewise, an equivalent quantity of thioxanthydrol is substituted for the xanthydrol and the procedure of Example 1 is repeated. In this case, the product is 1-(9-thioxanthenyl)isonipecotonitrile melting at about 185–186° C. after recrystallization from a mixture of chloroform and hexane. This compound has the following formula:

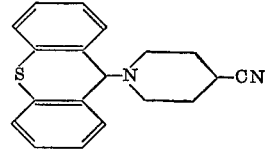

EXAMPLE 3

If an equivalent quantity of 4-phenylisonipecotonitrile is substituted for the isonipecotonitrile and the procedure of Example 1 is repeated, the product is 1-(9-xanthenyl)-4-phenylisonipecotonitrile. This compound melts at about 160–161° C. after recrystallization from a mixture of chloroform and hexane.

Similarly, if thioxanthydrol is reacted with 4-phenylisonipecotonitrile, the product is 1-(9-thioxanthenyl)-4-phenylisonipecotonitrile. This compound melts at about 151–152° C. after recrystallization from a mixture of chloroform and hexane; it has the following formula:

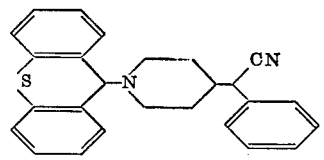

EXAMPLE 4

Other compounds which can be prepared according to the procedure of Example 1 by selecting the appropriate starting materials are, for example, 1-(9-xanthenyl)-4-(4-tolyl)isonipecotonitrile, 1-(9-xanthenyl)-4-(4-chlorophenyl)isonipecotonitrile, 1-(9-xanthenyl)-4-(3-fluorophenyl)isonipecotonitrile, and 1-(4-methyl-9-xanthenyl)-isonipecotonitrile.

What is claimed is:

1. A compound of the formula:

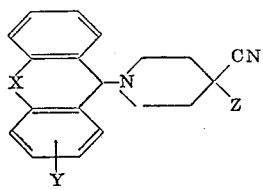

wherein X is selected from the group consisting of O and S; Y is selected from the group consisting of hydrogen, chlorine, and methyl; and Z is selected from the group consisting of hydrogen, phenyl, tolyl, and halophenyl.

2. A compound according to claim 1 which is 1-(9-xanthenyl)isonipecotonitrile.

3. A compound according to claim 1 which is 1-(9-thioxanthenyl)isonipecotonitrile.

4. A compound according to claim 1 which is 1-(9-xanthenyl)-4-phenylisonipecotonitrile.

References Cited

UNITED STATES PATENTS

| | | | |
|---|---|---|---|
| 3,252,984 | 5/1966 | Cusic et al. | 260—293.44 |
| 3,256,505 | 6/1966 | Cusic et al. | 260—293.44 |
| 3,262,934 | 7/1966 | Cusic et al. | 260—293.44 |

JAMES A. PATTEN, *Primary Examiner.*

U.S. Cl. X.R.

260—294.7; 424—267

UNITED STATES PATENT OFFICE
CERTIFICATE OF CORRECTION

Patent No. 3,433,793                                          March 18, 1969

Peter Yonan

It is certified that error appears in the above identified patent and that said Letters Patent are hereby corrected as shown below:

Column 1, lines 26 to 33, that portion of the formula reading:

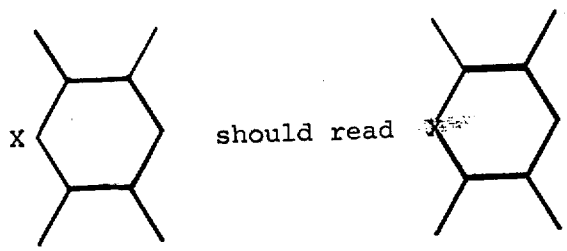

Column 2, lines 55 to 61, the formula should appear as shown below:

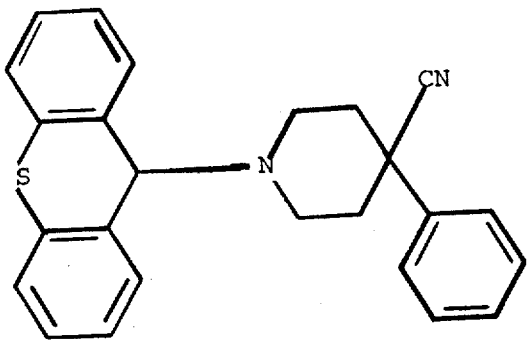

Signed and sealed this 14th day of April 1970.

(SEAL)
Attest:

EDWARD M. FLETCHER, JR.
Attesting Officer

WILLIAM E. SCHUYLER,
Commissioner of Paten